June 5, 1923.
O. C. JOHNSON
LOCK NUT
Original Filed Sept. 16, 1916
1,457,736
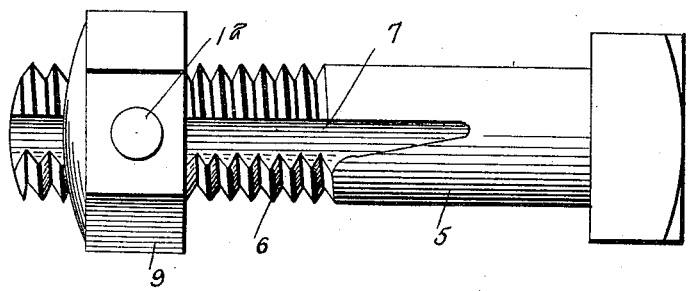
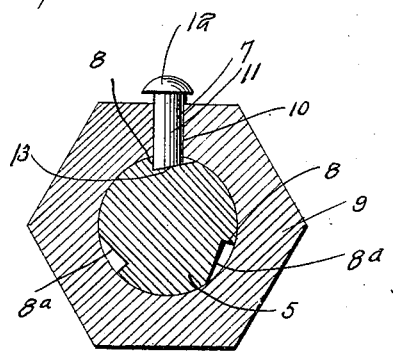
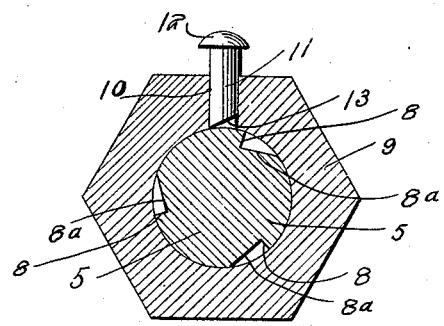
Witness
A. B. Stanton
Chas Seebold
Inventor
O. C. Johnson
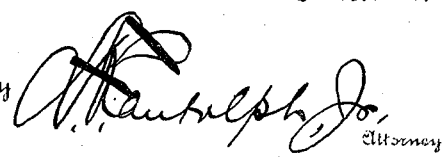

Patented June 5, 1923.

1,457,736

UNITED STATES PATENT OFFICE.

OSCAR C. JOHNSON, OF PITTSBURGH, PENNSYLVANIA.

LOCK NUT.

Substitute for application Serial No. 120,473, filed September 16, 1916. This application filed September 18, 1922. Serial No. 589,011.

*To all whom it may concern:*

Be it known that I, OSCAR C. JOHNSON, a citizen of the United States, residing at N. S. Pittsburgh, in the county of Allegheny and State of Pennsylvania, have invented certain new and useful Improvements in Lock Nuts; and I do hereby declare the following to be a full, clear, and exact description of the invention, such as will enable others skilled in the art to which it appertains to make and use the same.

This invention relates to improvements in nut locks, and has for its object to provide a device of this character including essentially a grooved bolt and a locking pin slidably fitted in the nut adapted for insertion in the grooves to lock the nut against rotational movement in one direction, the walls of the grooves being so inclined as to automatically thrust the locking pin to inoperative position when the nut is advanced, so as to facilitate removal thereof.

With this and other objects in view, the invention consists in the novel construction, combination and arrangements of parts as will be hereinafter specifically described, claimed and illustrated in the accompanying drawing, in which:

Figure 1 represents a plan view of the nut lock,

Figure 2 represents a transverse sectional view through the nut and bolt in the plane of the locking pin, and Figure 3 represents a transverse sectional view similar to Figure 2, illustrating the locking pin in inoperative position.

Referring to the drawing in detail, wherein similar reference numerals designate corresponding parts throughout the several views, the numeral 5 indicates a bolt having external screw threads 6, and a series of spaced longitudinal grooves 7 extending from the threaded terminal of the bolt to a point beyond the inner terminal of the screw threads. One wall of the groove 7 presents a radial shoulder 8, while the other wall, which is disposed substantially at right angles to a radial plane of the bolt interfitting the center of the surface of the wall, is indicated at 8ª, and is designed to automatically eject the locking pin when the nut is advanced upon the screw threads of the bolt.

A nut 9 is fitted upon the bolt 5, and is formed with a radial opening 10 communicating with the bore and receiving a snug fitting locking pin 11, having a head 12 at the outer terminal thereof. The inner extremity of the locking pin is beveled, as at 13, so as to fit upon the inclined wall 8ª of the groove in the bolt and prevent the pin from rotating. The pin 11 is snugly fitted in the opening 10 so that it will be frictionally held in various adjusted positions in the nut, and it is of such length that the head 12 is permanently maintained in spaced relation to the adjacent face of the nut and thus permits an instrument to be readily inserted under the head to facilitate removal thereof.

In use, the locking pin 11 is positioned, with relation to the nut, as shown in Figure 3, and the nut is advanced to the desired position upon the screw threads of the bolt 5, and the locking pin 11 is subsequently moved inwardly into one of the grooves in the bolt and engaging the radial shoulder of the groove positively locks the nut against retrograde rotation. The locking pin is retained in locked position by frictional engagement with the wall of the bore. When it is desired to remove the nut from the bolt, the nut is given a slight turn sufficient to cause the inclined wall 8ª of the groove to work against the beveled end 13 of the pin 11 and thus thrust the latter outwardly to the position shown in Figure 3, where it is held by friction during the removal of the nut. As clearly shown in Figure 2, the length of the pin 11 is such as to maintain the head 12 in spaced relation to the side face of the nut, when the pin is in locked position, thus permitting of the insertion of a suitable tool beneath the head to facilitate removal of the pin, should the latter become wedged in position.

What I claim is:

In a nut lock, a bolt provided through its threaded portion with a longitudinally extending groove shaped to provide a substantially radially disposed shoulder and an inclined surface extending from the base of said shoulder, a nut threaded on the bolt and provided with a radial bore, and a locking pin inserted through said bore and fitting tightly therein so as to be frictionally secured in the nut, the inner end of said pin being inclined and directed similarly to the inclined surface of said groove whereby the pin when in its innermost position will engage said radial shoulder so as to positively lock the nut against reverse rotation, the pin being moved into inoperative position by turning the nut in such direction as to thread it upon the bolt and frictionally maintained in this position to permit subsequent reverse rotation of said nut.

In testimony whereof I affix my signature in presence of a witness.

OSCAR C. JOHNSON.

Witness:
BENNETT S. JONES.